United States Patent [19]

Hering

[11] Patent Number: 4,794,027
[45] Date of Patent: Dec. 27, 1988

[54] PROCESS FOR COATING A BASE MATERIAL WITH AN ELASTOMER AND PRODUCT PRODUCED BY SUCH PROCESS

[76] Inventor: Reinhard F. Hering, Via Albaredo 34, CH-6645 Brione S.M., Switzerland

[21] Appl. No.: 716,646

[22] Filed: Mar. 27, 1985

[30] Foreign Application Priority Data

Mar. 28, 1984 [DE] Fed. Rep. of Germany ....... 3411451
Jul. 26, 1984 [DE] Fed. Rep. of Germany ....... 3427487

[51] Int. Cl.$^4$ ............................................. F16L 11/04
[52] U.S. Cl. .................................. 428/68; 156/307.7; 427/302; 427/393.5; 427/404; 427/407.1; 427/411; 427/412; 428/207; 428/208; 428/218; 428/290; 428/457; 428/461; 428/492; 428/493; 428/507; 428/511; 428/521
[58] Field of Search ................. 156/307.7; 427/302, 427/393.5, 404, 407.1, 411, 412; 428/207, 208, 218, 290, 457, 461, 492, 493, 507, 511, 521

[56] References Cited

U.S. PATENT DOCUMENTS

| | | | |
|---|---|---|---|
| 4,149,921 | 4/1979 | Stannard . | |
| 4,215,171 | 6/1980 | Marco et al. . | |
| 4,218,779 | 8/1980 | Hart et al. . | |
| 4,562,103 | 12/1985 | Hering | 428/76 |
| 4,567,087 | 1/1986 | Gey et al. . | |
| 4,604,155 | 8/1986 | McKiernan | 156/307.7 |

FOREIGN PATENT DOCUMENTS

| | | |
|---|---|---|
| 0009053 | 4/1980 | European Pat. Off. . |
| 910961 | 5/1954 | Fed. Rep. of Germany . |
| 1238199 | 4/1967 | Fed. Rep. of Germany . |
| 2927884 | 1/1980 | Fed. Rep. of Germany . |
| 0079149 | 6/1980 | Japan . |
| 393115 | 7/1932 | United Kingdom . |
| 692777 | 6/1953 | United Kingdom . |
| 2045109 | 10/1980 | United Kingdom . |

OTHER PUBLICATIONS

"Kautschuk & Gummi Kunstoffe", vol. 33, No. 2, 1980, pp. 95–100.

Primary Examiner—James C. Cannon
Attorney, Agent, or Firm—Martin J. Marcus

[57] ABSTRACT

A process is provided herein for coating a preformed, porous base material comprising a mineral fibrous or particle material or an organic fibrous or particle material or mixtures thereof to provide a novel preformed base material. The process comprises applying at atmospheric pressure a coating of a vulcanizable elastomeric material in unvulcanized form to a surface of such preformed, porous base material. The elastomeric material is permanently adhered to the preformed porous base material by a hot press, hot vulcanization step. In this way the elastomeric material is substantially simultaneously both adhered securely to one outer surface of the base material and is penetrated and impregnated below and into the same surface of the base material to be within the porous structure of the base material, and is vulcanized therein in situ by the joint action of a pressure of about 50 to about 500 Newton/cm$^2$ at a temperature of about 120° C. to about 300° C.

30 Claims, 2 Drawing Sheets

PROCESS FOR COATING A BASE MATERIAL WITH AN ELASTOMER AND PRODUCT PRODUCED BY SUCH PROCESS

BACKGROUND OF THE INVENTION (i) Field of the invention

This invention relates to a process for coating a preformed base material and to the coated preformed base material so provided (ii) Description of the Prior Art DE-As No. 1238199 disclose a film of isobutyl rubber which is used to cover and line containers. This film consists of two laminated, integral layers, one of which is adapted to be bonded by adhesion to the wall of the container to be lined.

The periodical "KAUTSCHUK+GUMMI. KUNSTSTOFFE" No. 2, 1980, page 95 to 100 teaches the application of rubber to containers, filters, pipes, valves, pumps and the like as a surface protection against corrosion. For this purpose, self-vulcanizing types of rubber are used, which are applied at low temperatures without surface pressure. However, according to the teachings of this publication, all holes and unevenesses of the base material, e.g. the surfaces of concrete, must be smoothed and sealed prior to the application of the rubber.

European Patent No. 0,009,053 (corresponding to U.S. Pat. No. 4,562,103) teaches a process for the production of weather-resistant slabs or shaped bodies. In such process, wood particles, or lignocellulose fibres, or other fibrous raw materials were mixed with binding agents, were covered with a layer of vulcanizable rubber or other elastomer and were pressed at high temperatures. This process, however, can not be applied in all cases, e.g. in those cases where the deformation and the hardening of the material were not a result of the material being exposed simultaneously to pressure and high temperatures, but instead were the result of predominantly cold chemical reactions occuring during the setting process. For this reason, in that process a different step must be taken here in the timing and mechanical separation of the production of material and the coating process.

Preformed panels or shaped slabs of light-weight concrete or porous concrete, or insulating slabs made of expanded clay, asbestos cement, asbestos fibres, or gypsum have been known a long time. These preformed panels are widely used as building material for outside and inside wall coverings, facings and roofs because of their flame resistance and rot resistance.

There are, however, limits to their use, mainly because of their weight and the extreme brittleness of the material. Any attempt to reduce the thickness of this material and to increase the size of the slabs, is met by an increased brittleness, which did not permit the use of thin slabs of the desirable larger size. Thus necessitated costly safety measures during mounting and construction at the building site.

It has been proposed to provide a protective and/or decorative surface treatment to such mineral material slabs. However, at the present time, multiple steps of repeated coating and drying procedures are required during which liquid film-forming coats or prefabricated adhesive coating materials are applied. All of these, however, have the disadvantage that they are not suited for permanent use. Often therefore, after a short period of time detachment of the surface coating occurs. This may result from adhesive fatique in the adhesive coating material which is applied to metal sheets, or plywood sheets which is helped along by changes in climate, temperature and dimensions. Coatings which have been applied in liquid form tend to dry out and crack, whereafter moisture enters by creeping underneath the coating, thereby detaching it. Even if weathering does not attack or destroy the material as such, the reliability and the protective function of the coating is no longer guaranteed. Furthermore, the alkaline content of inorganic binding agents generally has an anti-adhesive effect, unless such effect is neutralized or eliminated by creating special surfaces and layers, and by using very expensive adhesives or coating systems.

These difficulties exist to a very high degree in connection with the use of elastomers. Up to the present time no process is known which would guarantee a permanent, weather-resistant bonding of vulcanized elastomers, to mineral materials which are generally alkaline, by industrial production methods at economically justifiable costs. However, such group of elastomeric materials are particularly suited to be used for outer coatings of building material in an excellent manner, due to their weather resistance and color fastness, their lasting resilience and the possibility to be utilized at thicknesses which are physically effective which make them superior to other materials.

SUMMARY OF THE INVENTION (i) Aims of the Invention

One object of the present invention is the provision of a process for coating preformed mineral materials with an elastomeric coating which will give a longer lasting, damage-free protection as well as being easier and more economical to apply than coatings which have been applied in liquid form.

Another object of this invention is the provision of a process by which such surface coating will be more effectively and more durably applied to the base material.

Yet another object of this invention is the provision of a process of applying such a surface coating which will reduce the brittleness of the base material to such a degree that the material strength of the base material, the weight of the base material, and therefore its initial costs, can be significantly reduced.

Another object of this invention is to provide such a novel surface coated base material.

(ii) Statement of Invention

By this invention, a process is provided for coating a preformed, porous base material comprising a mineral fibrous or particulate material or an organic fibrous or particulate material or mixtures thereof, which process comprises: applying at atmospheric pressure a coating of vulcanizable elastomeric material in unvulcanized form of a surface of such preformed, porous base material; and permanently adhering such elastomeric material to such preformed porous base material by a hot press, hot vulcanization step; whereby the elastomeric material is substantially simultaneously both adhered securely to one outer surface of the base material and is penetrated into and impregnated below and into the same surface of the base material to be within the porous structure of the base material, and is vulcanized therein in situ by the joint action of a high pressure of about 50 to about 500 Newton/cm² and at a temperature of about 120° C. to about 300° C.

This invention also provides a process for coating a preformed, porous base material comprising a mineral fibrous or particulate material or an organic fibrous or particulate material or mixtures thereof, which process comprises: applying, at atmospheric pressure, a coating of a vulcanizable elastomeric material in unvulcanized form to a porous surface of the preformed, porous base material; and permanently adhering the elastomeric material to the preformed porous base material by a hot press, hot vulcanization step; whereby the elastomeric material is substantially simultaneously both adhered securely to one outer surface of the base material and is penetrated into and impregnated below and into the same surface of the base material to be within the porous structure of the base material, and is vulcanized therein in situ by the joint action of a high pressure of about 50 to about 500 Newton/cm$^2$ and at a high temperature of about 120° C. to about 300° C.; wherein the surface of the preformed porous base material is rendered more porous than the core thereof.

This invention further provides a a process for coating a preformed, porous base material comprising a mineral fibrous or particulate material or an organic fibrous or particulate material or mixtures thereof, which process comprises: applying, at atmospheric pressure, a coating of a vulcanizable elastomeric material in unvulcanized form to a porous surface of the preformed, porous base material; and permanently adhering the elastomeric material to the preformed porous base material by a hot press, hot vulcanization step; whereby the elastomeric material is substantially simultaneously both adhered securely to one outer surface of the base material and is penetrated into and impregnated below and into the same surface of the base material to be within the porous structure of the base material, and is vulcanized therein in situ by the joint action of a high pressure of about 50 to about 500 Newton/cm$^2$ and at a high temperature of about 120° C. to about 300° C.; wherein the coating of elastomeric material is applied in the form of a preformed film of unvulcanized material.

This invention still further provides a process for coating a preformed, porous base material comprising a mineral fibrous or particulate material or an organic fibrous or particulate material or mixtures thereof, which process comprises: applying, at atmospheric pressure, a coating of a vulcanizable elastomeric material in unvulcanized form to a porous surface of the preformed, porous base material; and permanently adhering the elastomeric material to the preformed porous base material by a hot press, hot vulcanization step; whereby the elastomeric material is substantially simultaneously both adhered securely to one outer surface of the base material and is penetrated into and impregnated below and into the same surface of the base material to be within the porous structure of the base material, and is vulcanized therein in situ by the joint action of a high pressure of about 50 to about 500 Newton/cm$^2$ and at a high temperature of about 120° C. to about 300° C.; wherein there is included the step of embedding an additional material within the elastomeric material.

This invention also provides a process for coating a preformed, porous base material comprising a mineral fibrous or particulate material or an organic fibrous or particulate material or mixtures thereof, which process comprises: applying, at atmospheric pressure, a coating of a vulcanizable elastomeric material in unvulcanized form to a porous surface of the preformed, porous base material; and permanently adhering the elastomeric material to the preformed porous base material by a hot press, hot vulcanization step; whereby the elastomeric material is substantially simultaneously both adhered securely to one outer surface of the base material and is penetrated into and impregnated below and into the same surface of the base material to be within the porous structure of the base material, and is vulcanized therein in situ by the joint action of a high pressure of about 50 to about 500 Newton/cm$^2$ and at a high temperature of about 120° C. to about 300° C.; wherein there is included the step of providing a further surface coating to the elastomer-coated base material.

This invention also provides a process for coating a preformed, porous base material comprising a mineral fibrous or particulate material or an organic fibrous or particulate material or mixtures thereof, which process comprises: applying, at atmospheric pressure, a coating of a vulcanizable elastomeric material in unvulcanized form to a porous surface of the preformed, porous base material; and permanently adhering the elastomeric material to the preformed porous base material by a hot press, hot vulcanization step; whereby the elastomeric material is substantially simultaneously both adhered securely to one outer surface of the base material and is penetrated into and impregnated below and into the same surface of the base material to be within the porous structure of the base material, and is vulcanized therein in situ by the joint action of a high pressure of about 50 to about 500 Newton/cm$^2$ and at a high temperature of about 120° C., to about 300° C.; wherein the preformed porous base material is formed predominantly of non-mineral substances.

This invention still further provides a process for coating a preformed, porous base material comprising a mineral fibrous or particulate material or an organic fibrous or particulate material or mixtures thereof, which process comprises: applying, at atmospheric pressure, a coating of vulcanizable elastomeric material in unvulcanized form to a porous surface of the preformed, porous base material; and permanently adhering the elastomeric material to the preformed porous base material by a hot press, hot vulcanization step; whereby the elastomeric material is substantially simultaneously both adhered securely to one outer surface of the base material and is penetrated into and impregnated below and into the same surface of the base material to be within the porous structure of the base material, and is vulcanized therein in situ by the joint action of a high pressure of about 50 to about 500 Newton/cm$^2$ and at a high temperature of about 120° C. to about 300° C.; wherein the preformed porous base material is formed predominantly of mineral substances.

This invention still further provides a process for coating a preformed, porous base material comprising a mineral fibrous or particulate material or an organic fibrous or particulate material or mixtures thereof, which process comprises: applying, at atmospheric pressure, a coating of vulcanizable elastomeric material in unvulcanized form to a porous surface of the preformed, porous base material; and permanently adhering the elastomeric material to the preformed porous base material by a hot press, hot vulcanization step; whereby the elastomeric material is substantially simultaneously both adhered securely to one outer surface of the base material and is penetrated into and impregnated below and into the same surface of the base material to be within the porous structure of the base material, and is vulcanized therein in situ by the joint action of a high pressure of about 50 to about 500 Newton/cm² and at a high temperature of about 120° C. to about 300° C.; wherein the preformed porous base material is formed predominantly of a mixture of non-mineral and mineral substances.

By this invention, as well, a preformed base material is provided comprising a mineral fibrous or particulate material or an organic fibrous or particulate material, or mixtures thereof, having permanently adhered to an outer surface thereof a vulcanized elastomeric material which is both adhered securely to one outer surface of the base material and is penetrated and impregnated below and into the same surface of the base material to be within the porous structure of the base material, and is vulcanized therein in situ at a high pressure and at a temperature of at least about 120° C.; wherein two mutually opposed outer surfaces have that vulcanized elastomeric material permanently adhered thereo.

This invention also provides a preformed porous base material comprising a mineral fibrous or particulate material or an organic fibrous or particulate material, or mixtures thereof, having permanently adhered to an outer surface thereof, a vulcanized elastomeric material which is substantially simultaneously both adhered securely to one outer surface of the base material and is penetrated into and impregnated below and into the same surface of the base material to be within the porous structure of the base material, and is vulcanized therein in situ by the joint action of a high pressure of about 50 to about 500 Newton/cm² and at a temperature of about 120° C. to about 300° C.; preferably wherein two mutually-opposed outer surfaces have the vulcanized elastomeric material permanently adhered thereto.

This invention further provides a preformed base material comprising a mineral fibrous or particulate material or an organic fibrous or particulate material, or mixtures thereof, having permanently adhered to an outer surface thereof, a vulcanized elastomeric material which is substantially simultaneously both adhered securely to one outer surface of the base material and is penetrated into and impregnated below and into the same surface of the base material to be within the porous structure of the base material, and is vulcanized therein in situ by the joint action of a high pressure of about 50 to about 500 Newton/cm² and at a temperature of about 120° C. to about 300° C.; wherein the vulcanized elastomeric material comprises a preformed film of unvulcanized material.

This invention also provides a preformed base material comprising a mineral fibrous or paticulate material or an organic fibrous or particulate material, or mixtures thereof, having permanently adhered to an outer surface thereof, a vulcanized elastomeric material which is substantially simultaneously both adhered securely to one outer surface of the base material and is penetrated into and impregnated below and into the same surface of the base material to be within the porous structure of the base material, and is vulcanized therein in situ by the joint action of a high pressure of about 50 to about 500 Newton/cm² and at a temperature of about 120° C. to about 300° C.; wherein the vulcanized film comprises a preformed film of two laminated layers of different hardnesses.

This invention still further provides a preformed base material comprising a mineral fibrous or particulate material or an organic fibrous or particulate material, or mixtures thereof, having permanently adhered to an outer surface thereof, a vulcanized elastomeric material which is substantially simultaneously both adhered securely to one outer surface of the base material and is penetrated into and impregnated below and into the same surface of the base material to be within the porous structure of said base material, and is vulcanized therein in situ by the joint action of a high pressure of about 50 to about 500 Newton/cm² and at a temperature of about 120° C. to about 300° C.; wherein there is included an additional material embedded therein comprising electrical heating wires, webbing reinforcing material, or fibrous reinforcing material.

This invention yet further provides a preformed base material comprising a mineral fibrous or particulate material or an organic fibrous or particulate material, or mixtures thereof, having permanently adhered to an outer surface thereof, a vulcanized elastomeric material which is substantially simultaneously both adhered securely to one outer surface of the base material and is penetrated into and impregnated below and into the same surface of the base material to be within the porous structure of the base material, and is vulcanized therein in situ by the joint action of a high pressure of about 50 to about 500 Newton/cm² and at a temperature of about 120° C. to about 300° C.; wherein there is included a further surface coating thereon comprising aluminum powder, aluminum foil, color pigments, plastic surface ornamentation or solar cells.

This invention still further provides a preformed base material comprising a mineral fibrous or particulate material or an organic fibrous or particulate material, or mixtures thereof, having permanently adhered to an outer surface thereof, a vulcanized elastomeric material which is substantially simultaneously both adhered securely to one outer surface of the base material and is penetrated into and impregnated below and into the same surface of the base material to be within the porous structure of the base material, and is vulcanized therein in situ by the joint action of a high pressure of about 50 to about 500 Newton/cm² and at a temperature of about 120° C. to about 300° C.; wherein the base material is formed predominantly of mineral substances comprising cement, concrete, light-weight concrete or porous concrete, expanded clay, asbestos cement, asbestos fibres or gypsum.

This invention also provides a preformed base material comprising a mineral fibrous or particulate material or an organic fibrous or particulate material, or mixtures thereof, having permanently adhered to an outer surface thereof, a vulcanized elastomeric material which is substantially simultaneously both adhered securely to one outer surface of the base material and is penetrated into and impregnated below and into the same surface of the base material to be within the porous structure of the base material, and is vulcanized therein in situ by the joint action of a high pressure of about 50 to about 500 Newton/cm² and at a temperature of about 120° C. to about 300° C.; wherein the base material is formed predominantly of mineral substances comprising cement, concrete, light-weight concrete or porous concrete, expanded clay, asbestos cement, asbestos fibres of gypsum; the base material further including an additive material which is adapted to cooperate with the elastomeric material to bond therewith by adhesion, fusion, or cross-linking.

This invention also provides a preformed base material comprising a mineral fibrous or particulate material or an organic fibrous or particulate material, or mixtures thereof, having permanently adhered to an outer surface thereof, a vulcanized elastomeric material which is substantially simultaneously both adhered securely to one outer surface of the base material and is penetrated into and impregnated below and into the same surface of the base material to be within the porous structure of the base material, and is vulcanized therein in situ by the joint action of a high pressure of about 50 to about 500 Newton/cm$^2$ and at a temperature of about 120° C. to about 300° C.; wherein the base material is formed of a mixture of non-mineral substances comprising plant fibres or particles, wood chips or fibres, or synthetic resin particles or fibres, and mineral substances comprising cement, concrete lightweight concrete or porous concrete, expanded clay, asbestos cement, asbestos fibres or gypsum; the base material further including an additive material which is adapted to cooperate with the elastomeric material to bond therewith by adhesion, fusion, or cross-linking.

(iii) Other Features of the Invention

By one feature of this invention, the rubber may be natural rubber or synthetic rubber.

By another feature of this invention, the surface of the preformed porous base material is rendered more porous than the core thereof. Thus, if the normal consistency of the base material is very dense and its porosity is too poor to be sufficient for a stable mechanical bonding, the adhesive effect can be increased by an artifically-created porosity at the surface of the material. For this purpose, by one feature the surface is rendered more porous by the application of a blowing agent to the surface thereof; for example, a so-called blowing agent (well-known to those skilled in the art) may be sprayed on, or sprinkled on, either to one outer surface or to both outer surfaces of the material or onto the inner side of the forming tool, prior to the setting of the base material. During the hot press vulcanization procedure, the expanding effect of the blowing agent results in an increased porosity at such surface or surfaces. By another feature, particles of a fugitive material (e.g. polystyrene beads, or polystyrene foam beads) are embedded into one or both surfaces of the base material. These are subsequently removed, or evaporate or melt away during the process of hot-pressing to provide cavities at the surface. They may also be used as adhesion-promoting substance.

By yet another feature of this invention, the elastomeric material is applied in the form of a preformed film of unvulcanized material. It is also possible, as a variation, to apply the elastomeric film which is applied to the base material as a laminated film, consisting of an outer, pre-vulcanized layer as well as of a second, unvulcanized layer, which is adapted to face the base material. This inner layer is of a lesser hardness, and is adapted to penetrate into the base substance during the hot press vulcanization providing the anchoring.

By still another feature of this invention, the process includes the additional step of embedding an additional material within the preformed porous base material. Thus, the product formed has an adhering elastomeric covering coating which may be composed of several individual layers of varying combination and/or consistency. This may additionally totally or partially receive further covering layers, e.g. of rubber, foils or metal sheets by vulcanization, fusion or adhesion. Electrical wires, reinforcing webbings or reinforcing fibrous substances may be added before the first hot press vulcanization step, or as an additional later step.

By yet another feature of this invention, the process includes the steps of providing a further surface coating to the elastomer-coated base material, such coating being aluminum powder, aluminum foil, color pigments, plastic surface ornamentation or solar cells. Thus, it is within the ambit of this invention to add plastic surface ornaments or an uneven base material to the elastomeric coating during the hot press vulcanization process. For example, structured dividing paper, pressed metal sheets, or tools may be used to create decorative and/or colored effects by imbedding substances which are sprinkled on or worked in.

In another feature of the invention, solar cells and/or other related functional parts may be embedded between the elastomeric covering coatings and the base material, or into the laminated covering coating, if the coating consists of several individual layers of varying material compositions and/or consistencies. The layers arranged on top of those must consist of elastomeric materials which are translucent. The elastomeric covering layers themselves can also be constructed to be functional parts of solar cells. Thus, solar cells can be integrated directly into the collector arrangements which convert the light of the sun into energy. This may be used, e.g. as a compound material suited for roofing, in which the solar cells are protected and fixed by means of their weather-resistant elastomeric outer coatings.

In other features of this invention, the preformed porous base material may comprise non-mineral substances, e.g. plant fibres or particles, wood chips or fibres, or synthetic resin particles or fibres. The preformed porous base material may comprise a mineral substance, e.g. cement, concrete, light-weight concrete or porous concrete, expanded clay, asbestos cement, asbestos fibres or gypsum. Alternatively, mixtures of such non-mineral and mineral materials may be used.

By yet another feature of this invention, the preformed porous base material includes an additive material which is adapted to cooperate with the elastomeric material to bond therewith by adhesion, fusion or cross-linking. Thus, the adhesiveness of the elastomeric material to the base material can be increased if this purely mechanical bonding is coupled with a chemical reaction. Accordingly, additives, additional charges or reinforcing substances may be included in the base material. Such additives may consist totally or partially of elastomeric and/or thermoplastic or other cross-linkable materials, e.g. rubber or synthetic thermoplastics materials. Then a cross-linking and/or thermoplastic fusing or melting takes place which anchors deeply into the lower regions of the base material and thus can replace or at least reinforce and support the mechanical adhesion.

Thus, by this invention, an elastomer-coated product is provided in which the base material consists of mineral or non-mineral substances, with or without additives, additional charges and/or reinforcing substances. At least one covering coating consisting initially of unvulcanized natural and/or synthetic rubber or other elastomeric material, is applied to one or both surfaces of the base material. These coatings are bonded to the base material in a press by way of hot vulcanization. The elastomeric coating material which is preferaby applied in form of a film, initially changes into a state of low viscosity due to the effect of the heat and pressure, and is pressed evenly into the pores of the base material. During the vulcanization process, this elastomer solidifies again, thereby anchoring itself solidly into the base material. This hot press, vulcanization process preferably occurs at pressures of between about 50 and 500 Newton/cm$^2$ and at temperatures of between about 120° C. and 300° C.

This invention also embraces the use of non-mineral base materials. The base materials may consist totally or predominantly of non-mineral substances, e.g. lignocellulose fibre chips, namely, wood fibres or chips, synthetic fibres or particles. It may also include additives and additional charges and/or reinforcing substances. The base material is provided with a weather-resistant, abrasion-resistant, blow-resistant and impact-resistant coating. Decorative surface coating consisting of particularly resistant natural and/or synthetic rubber or other elastomeric substances may be applied while they are still in their unvulcanized condition. These are subsequently bonded to the base material by means of adhesion-promoting substances during the hot press vulcanization process.

In practical use there are a multitude of additional combinations and variations of materials and step conceivable, apart from the principle ones mentioned above. However, the inventive concept resides in providing the base material which may contain mineral, or inorganic or organic binding agents, with elastomeric covering coatings by a hot press vulcanization process. As a result of such hot press vulcanization process, the elastomer binds to the base material by means of mechanical anchoring and/or cross-linking and/or thermoplastic reactions.

By this invention, prepared raw slabs or formed bodies of wood fibre, wood chips or other material or organic origin can even afterwards be provided with an adherent elastomeric coating where a coating in accordance with EP No. 0 009 053 could not be applied.

DESCRIPTION OF THE DRAWINGS

In the accompanying drawings.

Figure 1:
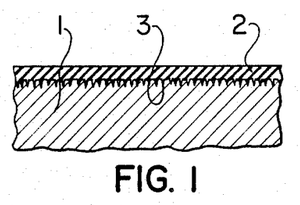
FIGS. 1 to 4 are cross-sectional views therough four different embodiments of the coated material provided in accordance with this invention.

DESCRIPTION OF PREFERRED EMBODIMENTS (i) Description of FIG. 1

FIG. 1 shows an enlarged, cross-sectional, view of a base material, e.g. a mineral material 1, in which an elastomeric covering layer has been pressed into the pores of the base material by the process of hot-press vulcanization of this invention. The elastomeric layer 2 is anchored therein, as shown at 3.

Figure 2:
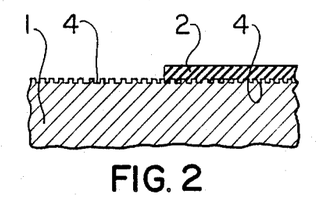

(ii) Description of FIG. 2

In FIG. 2, the base material, e.g. the mineral material has been produced with an increased porosity, only on the surface. The elastomeric coating 2 has been pressed into these additional and larger pores. Such elastomeric coating has been anchored inside the pores 4 during the hot-press vulcanization process of this invention.

Figure 3:
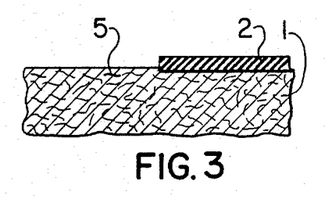

(iii) Description of FIG. 3

In FIG. 3, the base material, e.g. the mineral material 1 has been mixed with additives 5. The elastomeric covering coating 2 will thus bind with these additives during the hot press vulcanization process of this invention by way of cross-linking and/or fusing and/or adhesion.

Figure 4:
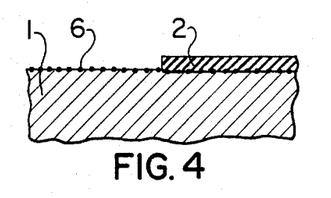

(iv) Description of FIG. 4

In FIG. 4, particles of substance 6 have been embedded into the surface of the base, e.g. mineral material prior to hardening. The elastomeric layer 2 is bonded to such substance 6 during the hot-press vulcanization process of this invention by way of cross-linking and/or fusion and/or adhesion.

(v) Description of FIG. 4

In FIG. 4, particles of substance 6 have been embedded into the surface of the base, e.g. mineral material prior to hardening. The elastomeric layer 2 is bonded to such substance 6 during the hot press vulcanization process of this invention by way of cross-linking and/or fusion and/or adhesion.

Figure 5:
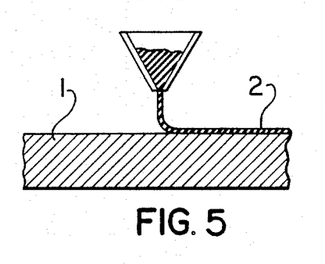
FIGS. 5 to 8 show cross-sectional views through four different embodiments of the manner in which a layer of an elastomeric coating is applied in accordance with process of embodiments of this invention.

(vi) Description of FIG. 5

FIG. 5 shows the application of the elastomeric covering coating onto the base, e.g. mineral material 1 by way of pouring through a funnel arrangement. However, any alternative suitable pouring device may be used instead of such funnel.

Figure 6:
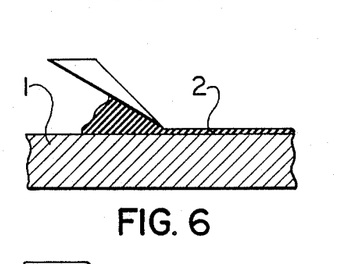

(vii) Description of FIG. 6

FIG. 6 shows the application of the elastomeric covering coating 2 onto the base, e.g. mineral, material 1 by means of a trowell.

Figures 7, 8, 9:
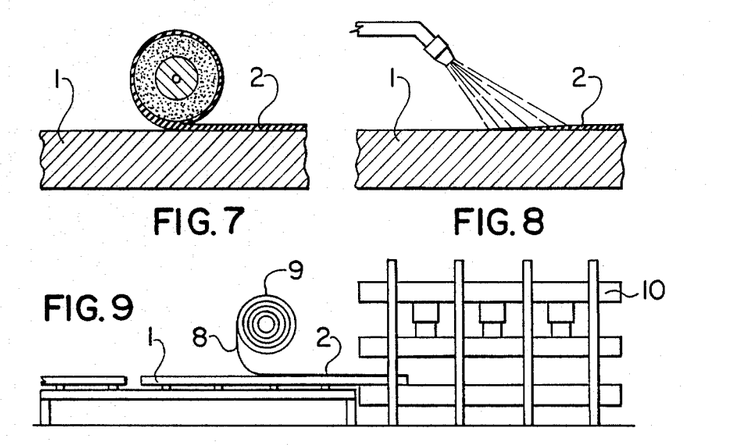
FIG. 9 shows, in diagrammatic form, one embodiment of the process in accordance with the invention.

(viii) Description of FIG. 7

FIG. 7 shows the application of the elastomeric covering coating 2 in the form of a film which is rolled onto the surface of the base, e.g. mineral, material 1.

(ix) Description of FIG. 8

FIG. 8 shows the application of the elastomeric covering coating 2 by being sprayed on through a nozzle in the form of a solution of the elastomer onto the surface of the base, e.g. mineral, material 1.

(x) Description of FIG. 9

FIG. 9 describes the coating process of this invention. The base, e.g. mineral, material 1 in the form of a preformed slab, is covered with the elastomeric coating 2, in this case in form of an unvulcanized film 8 which is being rolled off a roll 9. Subsequently the bonding between the base material 1 and the coating material 2 is shown to occur in the hot press 10 during a vulcanization procedure, the coating being thus vulcanized.

While the applying process has been shown to be by a film from a roll (as in FIG. 7) any other method of applying the coating as shown in FIGS. 5, 6 and 8 may be used. In addition, the adhesion-promoting techniques shown in FIGS. 2, 3 and 4 may also be used.

Figure 10:
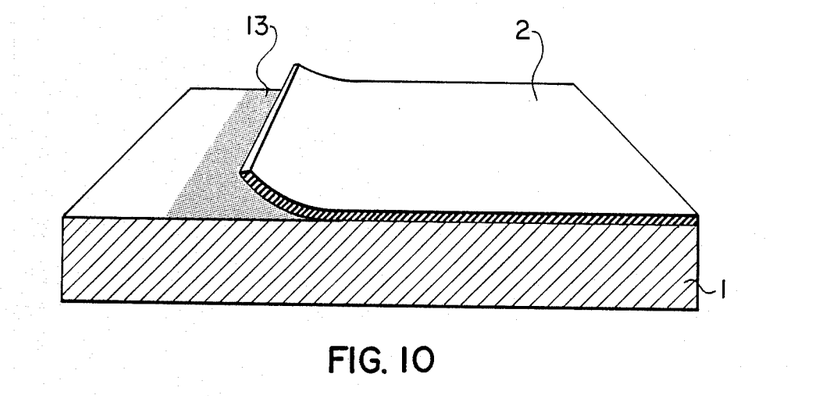
FIG. 10 is a perspective view of one embodiment of the coated material in accordance with one embodiment of this invention, where one portion of the elastomeric covering coating has been cut away and one portion of the surface of the base material has been lifted off.

(xi) Description of FIG. 10

FIG. 10 shows a perspective view of the elastomeric-coated product of this invention. The elastomeric coating 27 has been applied to the slab-shaped base material 1 in a hot press vulcanizing process of this invention. Added adhesion-promoting agents 13 have been applied either separately or have been added to the base material and/or to the coating material.

SUMMARY

According to this invention, a process has been provided by means of which material consisting of mineral substances (e.g. cement or concrete, gypsum, clay, optionally-containing additives and additional charges and/or reinforcing substances, can be coated with abrasion-resistant, impact-resistanct, and crackproof and decorative surface coating. The coating which consists of rubber or other elastomeric material is applied in an unvulcanized condition, and this coating is subsequently bonded solidly to the base material by a hot-press vulcanization process. The mechanical anchoring of the coating can be strengthened and/or improved by creating an area of increased porosity restricted to the surface of the base material. The elastomeric layer of layers of coating or coatings may be bonded to the additives, additional charges or reinforcing substances by way of cross-linking, fusion or adhesion during such hot-press vulcanization process. According to the invention non-mineral substances, e.g. plant fibres or—particles, synthetic fibres or—particles etc. optionally containing additives and additional charges, can likewise be bonded to a non-mineral material or to a mixture of mineral and non-mineral substances.

This invention also embraces the possibility of embedding solar cells ad optionally related functional parts into one or several of the outwardly translucent elastomeric covering coatings, which themselves could be functional parts of solar cells.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A process for coating a preformed, porous base material comprising a mineral fibrous or particulate material or an organic fibrous or particulate material or mixtures thereof, which process comprises: applying, at atmospheric pressure, a coating of a vulcanizable elastomeric material in unvulcanized form to a porous surface of said preformed porous base material; and permanently adhering said elastomeric material to said preformed porous base material by a hot press, hot vulcanization step; whereby said elastomeric material is substantially simultaneously both adhered securely to one outer surface of said base material and is penetrated into and impregnated below and into the same surface of same base material to be within the porous structure of said base material, and is vulcanized therein in situ by the joint action of a high pressure of about 50 to about 500 Newton/cm$^2$ and at a temperature of about 120° C. to about 300° C.

2. The process of claim 1 wherein said elastomeric material is a rubber selected from the group consisting of natural rubber and synthetic rubber.

3. A process for coating a preformed, porous base material comprising a mineral fibrous or particulate material or an organic fibrous or particulate material or mixtures thereof, which process comprises: applying at atmospheric pressure, a coating of a vulcanizable elastomeric material in unvulcanized form to a porous surface of said preformed, porous base material; and permanently adhering said elastomeric material to said preformed porous base material by a hot press, hot vulcanization step; whereby said elastomeric material is substantially simultaneously both adhered securely to one outer surface of said base material and is penetrated into and impregnated below and into the same surface of said base material to be within the porous structure of said base material, and is vulcanized therein in situ by the joint action of a high pressure of about 50 to about 500 Newton/cm$^2$ and at a high temperature of about 120° C. to about 300° C.; wherein the surface of said preformed porous base material is rendered more porous than the core thereof.

4. The process of claim 3 wherein said surface is rendered more porous by the application of a blowing agent to the surface thereof.

5. The process of claim 3 wherein said surface is rendered more porous by the application of fugitive particles to the surface thereof.

6. The process of claim 5 wherein said fugitive particles comprise solid polystyrene beads or foamed polystyrene beads.

7. A process for coating a preformed, porous base material comprising a mineral fibrous or particulate material or an organic fibrous or particulate material or mixtures thereof, which process comprises: applying at atmospheric pressure, a coating of a vulcanizable elastomeric material in unvulcanized form to a porous surface of said preformed, porous base material; and permanently adhering said elastomeric material to said preformed porous base material by a hot press, hot vulcanization step; whereby said elastomeric material is substantially simultaneously both adhered securely to one outer surface of said base material and is penetrated into and impregnated below and into the same surface of said base material, and is vulcanized therein in situ by the joint action of a high pressure of about 50 to about 500 Newton/cm$^2$ and at a high temperature of about 120° C. to about 300° C.; wherein said coating of elastomeric material is applied in the form of a preformed film of unvulcanized material.

8. The process of claim 7 wherein said film comprises a laminated film of two layers of different hardness.

9. The process of claim 8 wherein said laminated film comprises a prevulcanized layer, and an unvulcanized layer, which latter layer is adapted to be applied in contact with such preformed porous base material.

10. A process for coating a preformed, porous base material comprising a mineral fibrous of particulate material or an organic fibrous or particulate material or mixtures thereof, which process comprises: applying at atmospheric pressure, a coating of a vulcanizable elastomeric material in unvulcanized form to a porous surface of said preformed, porous base material; and permanently adhering said elastomeric material to said preformed porous base material by a hot press, hot vulcanization step; whereby said elastomeric material is substantially simultaneously both adhered securely to one outer surface of said base material and is penetrated into and impregnated below and into the same surface of said base material, and is vulcanized therein in situ by the joint action of a high pressure of about 50 to about 500 Newton/cm$^2$ and at a high temperature of about 120° C. to about 300° C.; wherein there is included the step of embedding an additional material within said elastomeric material.

11. The process of claim 10 wherein said additional material is electrical heating wires, webbing reinforcing material, or fibrous reinforcing material.

12. A process for coating a preformed, porous base material comprising a mineral fibrous or particulate material or an organic fibrous or particulate material or mixtures thereof, which process comprises: applyig at atmospheric pressure, a coating of a vulcanizable elastomeric material in unvulcanized form to a porous surface of said preformed, porous base material; and permanently adhering said elastomeric material to said preformed porous base material by a hot press, hot vulcanization step; whereby said elastomeric material is substantially simultaneously both adhered securely to one outer surface of said base material and is penetrated into and impregated below and into the same surface of said base material, and is vulcanized therein in situ by the joint action of a high pressure of about 50 to about 500 Newton/cm² and at a high temperature of about 120° C. to about 300° C.; wherein there is included the step of providing a further surface coating to said elastomer-coated base material.

13. The process of claim 12 wherein said further surface coating is aluminum powder, aluminum foil, color pigments, plastic surface ornamentation or solar cells.

14. A process for coating a preformed, porous base material comprising a mineral fibrous or particulate material or an organic fibrous or particulate material or mixtures thereof, which process comprises: applying, at atmospheric pressure, a coating of vulcanizable elastomeric material in unvulcanized form to a porous surface of said preformed, porous base material; and permanently adhering said elastomeric material to said preformed porous base material by a hot press,hot vulcanization step; whereby said elastomeric material is substantially simultaneously both adhered securely to one outer surface of said base material and is penetrated into and impregnated below and into the same surface of said base material, and is vulcanized therein in situ by the joint action of a high pressure of about 50 to about 500 Newton/cm² and at a high temperature of about 120° C. to about 300° C; wherein said preformed porous base material is formed predominantly of non-mineral substances.

15. The process of claim 14 wherein said non-mineral substances comprise plant fibres or particles, wood chips or fibres, or synthetic resin particles or fibres.

16. A process for coating a preformed, porous base material comprising a mineral fibrous or particulate material or an organic fibrous or particulate material or mixtures thereof, which process comprises: applying, at atmospheric pressure, a coating of a vulcanizable elastomeric material in unvulcanized form to a porous surface of said preformed, porous base material; and permanently adhering said elastomeric material to said preformed porous base material by a hot press, hot vulcanization step; whereby said elastomeric material is substantially simultaneously both adhered securely to one outer surface of said base material and is penetrated into and impregnated below and into the same surface of said base material, and is vulcanized therein in situ by the joint action of a high pressure of about 50 to about 500 Newton/cm² and at a high temperature of about 120° C. to about 300° C.; wherein said porous base is formed predominantly of mineral substances.

17. The process of claim 16 wherein said mineral substances comprise cement, concrete, light-weight concrete or porous concrete, expanded clay, asbestos cement, asbestos fibres or gypsum.

18. The process for coating a preformed, porous base material comprising a mineral fibrous or particulate material or an organic fibrous or particulate material or mixtures thereof, which process comprises: applying, at atmospheric pressure, a coating of a vulcanizable elastomeric material in unvulcanized form to a porous surface of said preformed, porous base material; and permanently adhering said elastomeric material to said preformed porous base material by a hot press, hot vulcanization step; whereby said elastomeric material is substantially simultaneously both adhered securely to one outer surface of said base material and is penetrated into and impregnated below and into the same surface of said base material, and is vulcanized therein in situ by the joint action of a high pressure of about 50 to about 500 Newton/cm² and at a high temperature of about 120° C. to about 300° C.; wherein said porous base is formed predominantly of a mixture of non-mineral substances and mineral substances.

19. A preformed base material comprising a mineral fibrous or particulate material or an organic fibrous or particulate material, or mixtures thereof, having permanently adhered to an outer surface thereof, a vulcanized elastomeric material which is substantially simultaneously both adhered securely to one outer surface of said base material and is penetrated into and impregnated below and into the same surface of said base material to be within the porous structure of said base material, and is vulcanized therein in situ by the joint action of a high pressure of about 50 to about 500 Newton/cm² and at a temperature of about 120° C. to about 300° C.

20. A preformed base material comprising a mineral fibrous or particulate material or an organic fibrous or particulate material, or mixtures thereof, having permanently adhered to an outer surface thereof, a vulcanized elastomeric material which is substantially simultaneously both adhered securely to one outer surface of said base material and is penetrated into and impregnated below and into the same surface of said base material to be within the porous structure of said base material, and is vulcanized therein in situ by the joint action of a high pressure of about 50 to about 500 Newton/cm² and at a temperature of about 120° C. to about 300° C.; wherein two mutually opposed outer surfaces have said vulcanized elastomeric material permanently adhered thereto.

21. A preformed base material comprising a mineral fibrous or particulate material or an organic fibrous or particulate material, or mixtures thereof, having permanently adhered to an outer surface thereof, a vulcanized elastomeric material which is substantially simultaneously both adhered securely to one outer surface of said base material and is penetrated into and impregnated below and into the same surface of said base material to be within the porous structure of said base material, and is vulcanized therein in situ by the joint action of a high pressure of about 50 to about 500 Newton/cm² and at a temperature of about 120° C. to about 300° C.; wherein said vulcanized elastomeric material comprises a preformed film of unvulcanized material.

22. A preformed base material comprising a mineral fibrous or particulate material or an organic fibrous or particulate material, or mixtures thereof, having permanently adhered to an outer surface thereof, a vulcanized elastomeric material which is substantially simultaneously both adhered securely to one outer surface of said base material and is penetrated into and impreganted into and into the same surface of said base material to be within the porous structure of said base material, and is vulcanized therein in situ by the joint action of a high pressure of about 50 to about 500 Newton/cm$^2$ and at a temperature of about 120° C. to about 300° C.; wherein said vulcanized film comprises a preformed film of two laminated layers of different hardnesses.

23. A preformed base material comprising a mineral fibrous or particulate material or an organic fibrous or particulate material, or mixtures thereof, having permanently adhered to an outer surface thereof, a vulcanized elastomeric material which is substantially simultaneously both adhered securely to one outer surface of said base material and is penetrated into and impregnated below and into the same surface of said base material to be within the porous structure of said base material, and is vulcanized therein in situ by the joint action of a high pressure of about 50 to about 500 Newton/cm$^2$ and at a temperature of about 120° C. to about 300° C.; wherein there is included an additional material embedded therein comprising electrical heating wires, webbing reinforcing material, or fibrous reinforcing material.

24. A preformed base material comprising a mineral fibrous or particulate material or an organic fibrous or particulate material, or mixtures thereof, having permanently adhered to an outer surface thereof, a vulcanized elastomeric material which is substantially simultaneously both adhered securely to one outer surface of said base material and is penetrated into and impregnated below and into the same surface of said base material to be within the porous structure of said base material, and is vulcanized therein in situ by the joint action of a high pressure of about 50 to about 500 Newton/cm$^2$ and at a temperature of about 120° C. to about 300° C.; wherein there is included a further surface coating thereon comprising aluminum powder, aluminum foil, color pigments, plastic surface ornamentation or solar cells.

25. A preformed base material comprising a mineral fibrous or particulate material or an organic fibrous or particulate material, or mixtures thereof, having permanently adhered to an outer surface thereof, a vulcanized elastomeric material which is substantially simultaneously both adhered securely to one outer surface of said base material and is penetrated into and impregnated below and into the same surface of said base material to be within the porous structure of said base material, and is vulcanized therein in situ by the joint action of a high pressure of about 50 to about 500 Newton/cm$^2$ and a temperature of about 120° C. to about 300° C.; wherein said base material is formed predominantly of mineral substances comprising cement, concrete, light-weight concrete or porous concrete, expanded clay, asbestos cement, asbestos fibres or gypsum.

26. A preformed base material comprising a mineral fibrous or particulate material or an organic fibrous or particulate material, or mixtures thereof, having permanently adhered to an outer surface thereof, a vulcanized elastomeric material which is substantially simultaneously both adhered securely to one outer surface of said base material and is penetrated into and impregnated below and into the same surface of said base material to be within the porous structure of said base material, and is vulcanized therein in situ by the joint action of a high pressure of about 50 to about 500 Newton/cm$^2$ and at a temperature of about 120° C. to about 300° C.; wherein said base material is formed predominantly of non-mineral substances comprising plant fibres or particles, wood chips or fibres, or synthetic resin particles or fibres.

27. A preformed base material comprising a mineral fibrous or particulate material or an organic fibrous or particulate material, or mixtures thereof, having permanently adhered to an outer surface thereof, a vulcanized elastomeric material which is substantially simultaneously both adhered securely to one outer surface of said base material and is penetrated into and impregnated below and into the same surface of said base material to be within the porous structure of said base material, and is vulcanized therein in situ by the joint action of a high pressure of about 50 to about 500 Newton/cm/$^2$ and at a temperature of about 120° C. to about 300° C.; wherein said base material is formed of a mixture of non-mineral substances comprising plant fibres or particles, wood chips or fibres, or synthetic resin particles or fibres, and mineral substances comprising cement, concrete light-weight concrete or porous concrete, expanded clay, asbestos cement, asbestos fibres or gypsum.

28. A preformed base material comprising a mineral fibrous or particulate material or an organic fibrous or particulate material, or mixtures thereof, having permanently adhered to an outer surface thereof, a vulcanized elastomeric material which is substantially simultaneously both adhered securely to one outer surface of said base material and is penetrated into and impregnated below and into the same surface of said base material to be within the porous structure of said base material, and is vulcanized therein in situ by the joint action of a high pressure of about 50 to about 500 Newton/cm$^2$ and at a temperature of about 120° C. to about 300° C.; wherein said base material is formed predominantly of mineral substances comprising cement, concrete, light-weight concrete or porous concrete, expanded clay, asbestos cement, asbestos fibres of gypsum; said base material further including an additive material which is adapted to cooperate with said elastomeric material to bond therewith by adhesion, fusion, or cross-linking.

29. A preformed base material comprising a mineral fibrous or particulate material or an organic fibrous or particulate material, or mixtures thereof, having permanently adhered to an outer surface thereof, a vulcanized elastomeric material which is substantially simultaneously both adhered securely to one outer surface of said base material and is penetrated into and impregnated below and into the same surface of said base material to be within the porous structure of said base material, and is vulcanized therein in situ by the joint action of a high pressure of about 50 to about 500 Newton/cm$^2$ and at a temperature of about 120° C. to about 300° C.; wherein said base material is formed predominantly of non-mineral substances comprising plant fibres or particles, wood-chips or fibres, or synthetic resin particles or fibres; said base material further including an additive material which is adapted to cooperate with said elastomeric material to bond therewith by adhesion, fusion, or cross-linking.

30. A preformed base material comprising a mineral fibrous or particulate material or an organic fibrous or particulate material, or mixtures thereof, having permanently adhered to an outer surface thereof, a vulcanized elastomeric material which is substantially simultaneously both adhered securely to one outer surface of said base material and is penetrated into and impregnated below and into the same surface of said base material to be within the porous structure of said base material, and is vulcanized therein in situ by the joint action of a high pressure of about 50 to 500 Newton/cm$^2$ and at a temperature of about 120° C. to about 300° C.; wherein said base material is formed of a mixture of non-mineral substances comprising plant fibres or particles, wood chips or fibres, or synthetic resin particles or fibres, and mineral substances comprising cement, concrete light-weight concrete or porous concrete, expanded clay, asbestos cement, asbestos fibres or gypsum; said base material further including an additive material which is adapted to cooperate with said elastomeric material to bond therewith by adhesion, fusion, or cross-linking.

* * * * *